United States Patent
Rodrigues et al.

(10) Patent No.: US 11,050,082 B1
(45) Date of Patent: Jun. 29, 2021

(54) COLLOIDAL IONIC-LIQUID ELECTROLYTES

(71) Applicant: Government of the United States, as represented by the Secretary of the Air Force, Wright-Patterson AFB, OH (US)

(72) Inventors: Stanley J. Rodrigues, Dayton, OH (US); Padmakar D. Kichambare, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 163 days.

(21) Appl. No.: 15/717,050

(22) Filed: Sep. 27, 2017

Related U.S. Application Data

(60) Provisional application No. 62/401,295, filed on Sep. 29, 2016.

(51) Int. Cl.
*H01M 10/0566* (2010.01)
*H01M 10/056* (2010.01)
(Continued)

(52) U.S. Cl.
CPC ..... *H01M 10/0563* (2013.01); *H01M 10/056* (2013.01); *H01M 10/0566* (2013.01);
(Continued)

(58) Field of Classification Search
None
See application file for complete search history.

(56) References Cited

U.S. PATENT DOCUMENTS

| 6,986,970 B1 | 1/2006 | Kumar et al. |
| 2004/0094741 A1* | 5/2004 | Sato ............ H01M 10/0566 252/1 |

(Continued)

FOREIGN PATENT DOCUMENTS

| JP | 2010-176869 | * 8/2010 |
| JP | 2015187057 | 10/2015 |

OTHER PUBLICATIONS

Kim, H., LiSICON-Ionic Liquid Electrolyte for Lithium ion Battery, School of Chemical and Biomolecular Engineering, Georgia Institute of Technology, 2011.
(Continued)

*Primary Examiner* — Jonathan Crepeau
(74) *Attorney, Agent, or Firm* — AFMCLO/JAZ; Timothy M. Barlow

(57) ABSTRACT

A colloidal ionic-liquid electrolyte for electrochemical devices is provided. The colloidal ionic-liquid electrolyte includes a room temperature ionic-liquid, a lithium salt, and a ceramic particle phase (powder) including a high dielectric material dispersed in the ionic-liquid electrolyte, wherein the colloidal ionic-liquid electrolyte exhibits enhanced ionic conductivity in the electrochemical device compared to the ionic conductivity of the pure room temperature ionic-liquid. The high dielectric material exhibits a first dielectric constant of about 200 or more, and a first mean particle size of about 2000 nm or less. The enhanced ionic conductivity is observed in the temperature range of about 75° C. to about −60° C. and is more pronounced at colder temperatures. In addition, the colloidal ionic-liquid electrolyte exhibits enhanced non-flammability, enhanced mechanical stability, enhanced thermal stability and suppressed flowability.

11 Claims, 11 Drawing Sheets

(51) Int. Cl.
*H01M 10/0569* (2010.01)
*H01M 10/0567* (2010.01)
*H01M 10/0563* (2010.01)
*C01B 13/00* (2006.01)
*C01D 15/00* (2006.01)
*C01B 35/06* (2006.01)
*H01M 10/0525* (2010.01)

(52) U.S. Cl.
CPC ... *H01M 10/0567* (2013.01); *H01M 10/0569* (2013.01); *C01B 13/00* (2013.01); *C01B 35/066* (2013.01); *C01D 15/005* (2013.01); *H01M 10/0525* (2013.01)

(56) References Cited

U.S. PATENT DOCUMENTS

| | | |
|---|---|---|
| 2009/0105400 A1 | 4/2009 | Komatsu et al. |
| 2014/0077138 A1 | 3/2014 | Taha-Tijerina et al. |
| 2014/0315096 A1 | 10/2014 | Borges et al. |
| 2016/0064770 A1* | 3/2016 | Lee .................. H01M 4/382 429/303 |
| 2018/0040904 A1* | 2/2018 | Choi .................. H01M 2/1686 |
| 2018/0115014 A1* | 4/2018 | Zanotti ............. H01M 10/056 |

OTHER PUBLICATIONS

Rodrigues, M., Hexagonal Boron Nitride-Based Electrolyte Composite for Li-Ion Battery Operation from Room Temperature to 150° C., Adv. Energy Mater. 2016, 1600218.

Smiglak, M., Ionic liquids for energy, materials, and medicine, Chem. Commun., 2014, 50, 9228.

Tsunashima, K., Low viscous and highly conductive phosphonium ionic liquids based on bis(fluorosulfonyl)amide anion as potential electrolytes, Electrochemistry Communications 13 (2011) 178-181.

Armand, M., ionic-liquid materials for the electrochemical challenges of the future, nature materials vol. 8 Aug. 2009.

* cited by examiner

COLLOIDAL IONIC-LIQUID ELECTROLYTES

PRIORITY

Pursuant to 37 C.F.R. § 1.78(a)(4), this application claims the benefit of and priority to prior filed Provisional Application Ser. No. 62/401,295, filed Sep. 29, 2016, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention generally relates to the field of electrolytes used in electrochemical devices, and more particularly to colloidal suspensions of dielectric nanopowders in room temperature ionic liquids useful in electrochemical devices such as lithium-ion batteries.

BACKGROUND OF THE INVENTION

Electrochemical devices, especially batteries like lithium-ion batteries use liquid electrolytes composed of lithium salt and a mixture of cyclic and linear carbonates such as ethylene carbonates (EC), dimethyl carbonates (DMC), ethyl methyl carbonates (EMC), diethyl carbonates (DEC), etc. These organic carbonates solvents have high vapor pressures, leading to high volatility and are highly flammable, posing serious safety risks in their use and limiting the battery operational temperature. These electrochemical devices are not abuse-tolerant and under extreme conditions, such as elevated temperature, elevated voltage, or a short circuit, the volatile liquid electrolytes can react with other components to generate significant heat and gas, ignite the liquid electrolyte, generate thermal runaway and/or explode the device. These events can pose serious safety risks in their use.

Ionic-liquids are essentially molten salts with attractive properties for electrochemical applications including a wide electrochemical stability window, non-flammability, low vapor pressure, high thermal stability, and low to moderate ionic conductivity making them promising candidates for a new generation of safe electrolytes for electrochemical devices. An ionic-liquid is typically composed of a large cation and a charge-delocalized anion, featuring dissymmetry from the cation and flexibility from the anion. Ionic-liquid electrolytes can be custom designed and tailored for specific applications using a wide variety of cations and anions.

Several challenges exist for implementation of ionic-liquids as electrolytes for electrochemical devices. Ionic-liquids are inherently highly viscous at room temperature with typical viscosities ranging between 10 and 100 centipoise (cPs), compared to 3 to 4 cPs in conventional organic carbonate-based electrolytes. The high viscosity of ionic-liquids renders low ionic conductivities. Ionic-liquids with dissolved lithium salts also have the tendency to form clusters associated with lithium ion, reducing the lithium-ion conductivity and lithium diffusivity.

Furthermore, the operational temperature range of electrochemical devices using ionic-liquids is reduced, especially in the cold temperature region. The inherent high viscosity is further increased at cold temperatures, e.g., 0° C. and below, significantly reducing ionic conductivity. In addition, lithium diffusivity and charge transfer reaction kinetics at the electrode-electrolyte interfaces are reduced at low temperatures. Thus, the overall performance of the electrochemical devices using ionic-liquids as an electrolyte is significantly reduced in the cold temperature range.

Approaches to extend the operational temperature range of ionic-liquids, especially in the cold temperature region, and improve the performance of electrochemical devices using them may include external devices like heaters, insulating blankets, and phase change materials. These external mitigating strategies may improve performance by reducing the viscosity of the ionic-liquid electrolyte, increasing charge transfer reaction kinetics under cold temperature conditions, but there are trade-offs like increased cost per kilowatt-hour and increased weight, which decreases the energy and power densities of the devices.

Therefore, a need exists for new, inherently safe electrolytes, characterized by a non-flammable nature, high electrochemical stability, and possessing high ionic conductivity over a wide temperature range that overcomes one or more of the problems of the prior art.

SUMMARY OF THE INVENTION

The present invention overcomes one or more of the foregoing problems and other shortcomings, drawbacks, and challenges of conventional electrolyte compositions. While the invention will be described in connection with certain embodiments, it will be understood that the invention is not limited to these embodiments. To the contrary, this invention includes all alternatives, modifications, and equivalents as may be included within the spirit and scope of the present invention.

In accordance with an embodiment of the present invention, an electrolyte composition for an electrochemical device is provided. The electrolyte composition comprises: a room temperature ionic-liquid, a lithium salt, and a ceramic powder having a first dielectric constant of about 200 or more, and a first mean particle size ($D^1v50$) of about 2,000 nm or less, wherein the electrolyte composition is a liquid at 25° C. and has increased conductivity in the electrochemical device compared to the conductivity of the pure room temperature ionic-liquid. In an embodiment, the high dielectric material may be selected from the group consisting of $Bi_2O_3$, $BaTiO_3$, $SrTiO_3$, $KSrTiO_3$, $KTaNbO_3$, $Pb_3MgNb_2O_9$, and mixtures thereof. With regard to the "room temperature" conditions stated above, an ionic liquid is a salt in which the anions and cations are poorly coordinated staying as a liquid below 100° C. or even at room temperature and below (room temperature ionic liquids, RTILs). These RTILs have a large liquid temperature range from −40 to 25° C. In some cases, depending on the particular ionic liquid, the liquid temperature range is from −40 to 100° C.

In accordance with yet another embodiment, the ceramic powder further comprises a low dielectric material having a second dielectric constant of about 50 or less, and a second mean particle size ($D^2v50$) of about 100 nm or less. In an embodiment, the low dielectric material may be selected from the group consisting of $HfO_2$, $MgO$, $ZnO$, $SrO$, $BaO$, $CaO$, $ZrO_2$, $Al_2O_3$, $SiO_2$, $SiC$, $Si_3N_4$, $BN$, and mixtures thereof.

In another embodiment, the first mean particle size ($D^1v50$) of the high dielectric material is in a range from about 5 nm to about 2,000 nm, and the second mean particle size ($D^2$v50) of the low dielectric material is in a range from about 5 nm to about 100 nm. In one aspect of this embodiment, a ratio between the first dielectric constant and the second dielectric constant may be in a range from about 4 to about 2,500. In accordance with yet another embodiment, the high dielectric material comprises barium titanate (BaTiO$_3$), and the low dielectric material comprises boron nitride (BN).

In accordance with embodiments of the present invention, the lithium salt of the electrolyte composition may be selected from lithium halides or complex fluorides. For example, the lithium salt may be selected from lithium hexafluorophosphate or lithium tetrafluoroborate, or lithium bis(trifluoromethylsulfonyl)imide. Complex fluorides are conventional lithium salts that are commonly used in electrolytes for lithium ion batteries. The anion of complex fluorides have a complex chemical structure compared to the anions of lithium halides. For example, PF$_6^-$ (hexafluorophosphate) and TFSI$^-$ (bistrifluoromethane sulfonimide) are anions of complex fluorides. The anion of lithium halides have simple structures, e.g. Cl$^-$, Br$^-$, I$^-$.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention. It will be appreciated that for purposes of clarity and where deemed appropriate, reference numerals have been repeated in the figures to indicate corresponding features.

For brevity, various abbreviations for exemplary chemical species are used herein: 1-butyl-1-methyl pyrrolidinium bis(trifluoromethylsulfonyl)imide (PYR14TFSI); 1-ethyl-3-methyl imidazolium bis(trifluoromethylsulfonyl)imide (EMImTFSI); lithium bis(trifluoromethylsulfonyl)imide (LiTFSI); barium titanate (BT); and boron nitride (BN).

Figure 1:
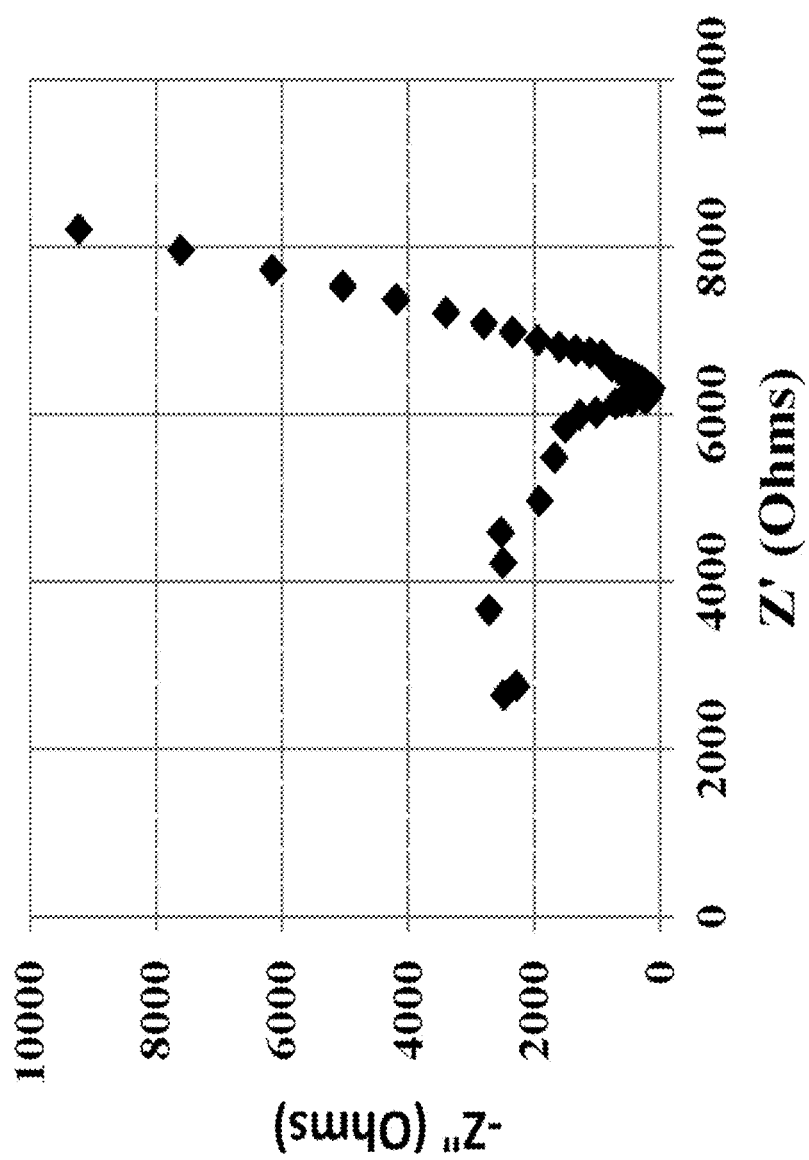
FIG. 1 shows a typical Nyquist plot for EMImTFSI+LiTFSI+100 nm BT+20 nm BN electrolyte at −25° C., according to an embodiment of the invention.

It should be understood that the appended drawings provide a simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding.

DETAILED DESCRIPTION OF THE INVENTION

The presence of ceramic powders comprising a high dielectric nanopowder in the colloidal electrolyte compositions embodied within the present invention improves the mechanical and thermal properties of the ionic-liquid electrolyte. The colloidal electrolyte compositions display increased conductivity in electrochemical devices compared to the conductivity of the ionic-liquid electrolyte alone. In addition, the colloidal electrolyte has increased viscosity which reduces the flowability of the electrolyte, making it easier to contain, but still remains a liquid at 25° C. Both of the ionic liquids detailed below, 1-butyl-1-methyl pyrrolidinium bis(trifluoromethylsulfonyl)imide (PYR14TFSI) and 1-ethyl-3-methyl imidazolium bis(trifluoromethylsulfonyl)imide (EMImTFSI), are liquids at 25° C. The melting points of PYR14TFSI and EMImTFSI are −7° C. and −15° C., respectively. Since PYR14TFSI is liquid from −7° C. to 75° C., the colloidal electrolyte (with the addition of nano powders) composition prepared with PYR14TFSI is also a liquid, from −7° to 75° C. Similarly, the colloidal electrolyte composition prepared with EMImTFSI is also a liquid, from −15° to 75° C. This provides a great advantage.

In accordance with embodiments of the present invention, the colloidal electrolyte composition comprises a room temperature ionic-liquid, a lithium salt, and a ceramic powder comprising a high dielectric material having a first dielectric constant of about 200 or more, and a first mean particle size ($D^1v50$) of the high dielectric material of about 2,000 nm or less. The colloidal electrolyte composition is a liquid at 25° C. and exhibits increased conductivity in electrochemical devices compared to the conductivity of the pure room temperature ionic-liquid.

The room temperature ionic-liquids (RTIL) in the compositions of the present disclosure comprise an organic cation and an anion. In some embodiments, the RTIL include, without limitation, organic cations comprising a quaternary ammonium moiety, an imidazolium moiety, a piperidinium moiety, a pyrrolidinium moiety, a pyrazoliuim moiety, a guanidinium moiety, a pyridinium moeity, or combinations thereof. In some embodiments, the RTIL include, without limitation, anions such as a halide, bis(fluorosulphonyl)imide, bis(trifluoromethanesulphonyl)imide, bis(perfluoro-ethanesulfonyl)imide, trifluoromethylsulphonate, methylsulfonate, ethylsulfonate, phenylsulfonate, p-toluenesulfonate, dicyanimide, complex fluorides such as hexafluorophosphate or tetrafluoroborate, or combinations of any of the foregoing.

Non-limiting examples of RTIL include 1-Butyl-1-methyl pyrrolidinium bis(trifluoromethylsulfonyl)imide (PYR14TFSI); 1-Ethyl-3-methyl imidazolium bis(trifluoromethylsulfonyl)imide (EMImTFSI); 1-Butyl-2,3-dimethylimidazolium bis(trifluoromethylsulfonyl)imide (BMMI-TFSI); 1-Butyl-1-methylpiperidinium bis(trifluoromethylsulfonyl)imide; 1-Butyl-3-methylimidazolium hexafluorophosphate, 1-Butyl-3-methylimidazolium tetrafluoroborate, 1-Methyl-1-propylpiperidinium bis(trifluoromethylsulfonyl)imide, 1-Butyl-1-methylpiperidinium bis(trifluoromethylsulfonyl)imide (PP-TFSI), Diethylmethylsulfonium bis(trifluoromethylsulfonyl)imide, N,N-diethyl-N-methyl-N-(2-methoxyethyl)ammonium bis(trifluoromethylsulfonyl)imide, or combinations thereof.

The colloidal electrolytes of the present disclosure also include a lithium salt. Non-limiting exemplary lithium salts include, lithium bis(trifluoromethylsulfonyl)imide (LiTFSI), lithium hexafluorophosphate ($LiPF_6$), lithium tetrafluoroborate ($LiBF_4$), lithium bis(oxalate)borate (LiBOB), lithium bis(perfluoroethylsulfonyl)imide (LiBETI), lithium 4,5-dicyano-1,2,3-triazolate (LiDCTA), lithium 4,5,-dicyano-2-trifluroromethyl-imidazolide (LiTDI), lithium 4,5-dicyano-2-pentafluroethyl-imidazolide (LiPDI), or combinations thereof.

In some embodiments, the total concentration of the lithium salt dissolved in the RTIL includes, without limitation, about 0.2 mol/L, about 0.5 mol/L, about 0.8 mol/L, or about 1 mol/L, or in a range between any two of the foregoing. In some embodiments the total concentration of lithium salts dissolved in the colloidal ionic-liquid is about 1 mol/L. Alternatively, the lithium salt and the RTIL may be combined based on a molar ratio. For example, the molar ratio of lithium salt to RTIL may be from about 1:20 to about 1:1. Accordingly, the molar ratio of lithium salt to RTIL may be about 1:20, about 1:19, about 1:15, about 1:12, about 1:10, about 1:9, about 1:5, about 1:3, about 1:2, about 1:1, or in a range between any two of the foregoing.

In accordance with embodiments of the present invention, the high dielectric material component of the ceramic powder has a first dielectric constant of about 200 or more, and a first mean particle size ($D^1v50$) of about 2,000 nm or less. For example, the first dielectric constant may be about 200, about 250, about 500, about 750, about 1,000, about 1,250, about 1,500, about 1,750, about 2,000, about 4,000, about 5,000, about 6,000, about 8,000, about 10,000, or within a range between any two of the foregoing. Additionally, the first mean particle size may be about 2,000 nm, about 1,750 nm, about 1,500 nm, about 1,250 nm, about 1,000 nm, about 750 nm, about 500 nm, about 250 nm, about 200 nm, about 100 nm, about 50 nm, about 30 nm, about 20 nm, about 10 nm, about 5 nm, or within a range between any two of the foregoing, for example. Non-limiting, exemplary high dielectric materials may comprise $Bi_2O_3$, $BaTiO_3$, $SrTiO_3$, $KSr_2Nb_5O_{15}$, $KTaNbO_3$, or $Pb_3MgNb_2O_9$.

In another embodiment, the ceramic powder further comprises a low dielectric material having a second dielectric constant of about 50 or less, and a second mean particle size ($D^2v50$) of the low dielectric material of about 100 nm or less. For example, the second dielectric constant may be about 50, about 40, about 30, about 20, about 10, about 5, about 4, or within a range between any two of the foregoing. Additionally, the second mean particle size may be about 100 nm, about 80 nm, about 75 nm, about 50 nm, about 30 nm, about 20 nm, about 10 nm, about 5 nm, or within a range between any two of the foregoing, for example. Non-limiting examples of low dielectric materials include ceramic particles such as $HfO_2$, MgO, ZnO, SrO, BaO, CaO, $ZrO_2$, $Al_2O_3$, $SiO_2$, SiC, $Si_3N_4$, BN, or mixtures thereof.

The dielectric constant, which is a measure of a material's relative permittivity, i.e., the measure of resistance that is encountered when forming an electric field in free space, may be determined by a complex permittivity measurement technique (ASTM D150-11). Additionally, the mean particle size ($D_v50$) of the high dielectric material may be determined by a laser light scattering technique (ASTM C1070-01 (2014)).

In an aspect of this embodiment, where the colloidal electrolyte includes a high dielectric material and a low dielectric material, a ratio between the first dielectric constant and the second dielectric constant may be in a range from about 4 to about 2,500. For example, the ratio between the first dielectric constant and the second dielectric constant may be about 2,500, about 2,000, about 1,500, about 1,000, about 800, about 700, about 600, about 500, about 450, about 400, about 350, about 300, about 250, about 200, about 150, about 100, about 75, about 50, about 25, about 10, about 4, or in a range between any two of the foregoing. In another aspect, a difference between the first dielectric constant and the second dielectric constant may be about 175 or more. For example, the difference between the first dielectric constant and the second dielectric constant may be about 175 or more, about 250 or more, about 500 or more, about 750, or more, or about 1,000 or more. In an embodiment, the high dielectric material may comprises $BaTiO_3$ having a dielectric constant of about 2,000; and the low dielectric material may comprise boron nitride (BN) having a dielectric constant of about 4, which provides a ratio of about 500.

The colloidal electrolyte generally comprises the RTIL in an amount between about 50 wt % to about 98 wt %; and the ceramic powder in an amount between about 50 wt % to about 2 wt %, wherein wt % is based on the combined weight of the RTIL and the ceramic powder. For example, colloidal electrolyte may comprise about 50 wt % to about 95 wt % of the RTIL, and about 5 wt % to about 50 wt % of the ceramic powder; or about 75 wt % to 90 wt % of the RTIL, and about 25 wt % to about 10 wt % of the ceramic powder.

The colloidal electrolyte may be made by any suitable process. The ceramic powder may be mixed in the RTIL to form the colloidal electrolyte. The mixing can be done manually or using a mechanical, ultrasonic, or other type of mixer. The colloidal electrolytes can also be prepared by an in-situ process in which particles are precipitated in a compatible liquid phase. The lithium salt may be added to the RTIL prior to or after combining the ceramic powder(s).

The resultant colloidal ionic-liquid electrolyte is a liquid at 25° C., and demonstrates increased conductivity in electrochemical applications compared to the conductivity of the RTIL alone.

The colloidal electrolyte of the present invention is described in more detail by way of the following examples, which are intended to be illustrative of the invention, but are not intended to be limiting in scope.

EXPERIMENTS

Materials/Preparation

In this work, two ionic-liquids were used with different cations but the same anion, namely, 1-butyl-1-methyl pyrrolidinium bis(trifluoromethylsulfonyl)imide (PYR14TFSI) and 1-ethyl-3-methyl imidazolium bis(trifluoromethylsulfonyl)imide (EMImTFSI). PYR14TFSI, EMImTFSI and lithium bis(trifluoromethane) sulfonamide (LiTFSI) salt were obtained from Aldrich, USA and used as received. Regarding the ceramic powders, barium titanate (BT) with average particle size of 10 nm (Dv90), was obtained from Nano-Oxides, Inc. USA. BT having an average particles size of 100 nm and 400 nm (Dv90) were purchased from Inframat Advanced Materials, USA. BT having an average particle size of 2 μm was obtained from Sigma-Aldrich, USA. Boron nitride (BN) having an average particle size of 20 nm (Dv90) was obtained from Alfa Aesar, USA.

A lithium salt, LiTFSI, was dissolved in ionic-liquid (PYR14TFSI and EMImTFSI) in a 1:9 molar ratio to obtain the ionic-liquid/salt solution. Colloidal electrolytes were prepared by thoroughly mixing 10 wt % of ceramic powder in ionic-liquid/salt solution. These included 10 wt % of 10 nm, 100 nm, 400 nm, and 2 μm BT, 10 wt % of 20 nm BN, and a blend of 20 nm BN and 100 nm BT, 5 wt % each. Processing of all electrolytes was performed in a very low relative humidity dry-room (R.H.<0.1% at 20° C.).

Figure 10:
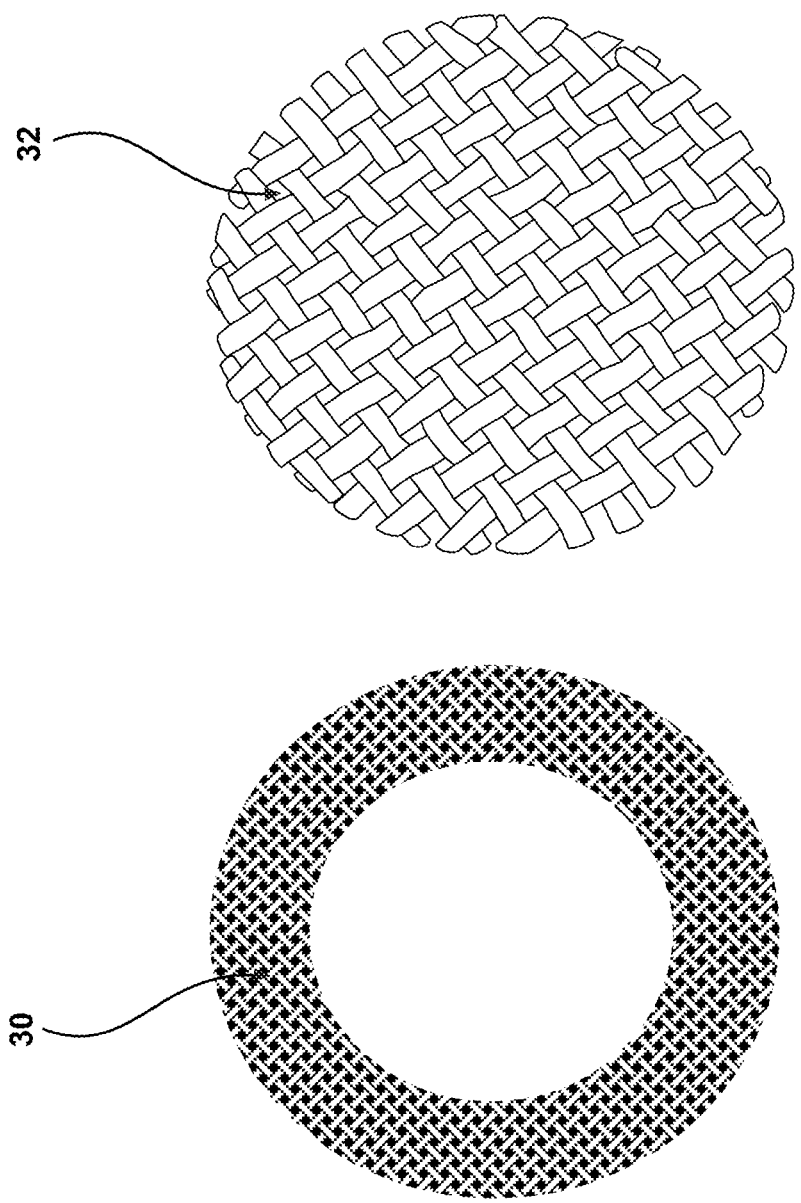
FIG. 10 depicts porous separators/spacers for use in making a cell, according to an embodiment of the invention.

The electrochemical measurements on the electrolytes were performed using a two-electrode cell configuration. The ionically blocking electrodes were made out of stainless steel with a diameter of 1.24 cm (active area, A=1.22 cm$^2$). Non-conductive separator/spacer material were soaked with sample electrolytes and sandwiched between electrodes. The thickness (I) of the separator/spacer was used as the distance between the electrodes. Several highly porous separators/spacers were used; FIG. 10 depicts a polypropylene mesh disc 32 and a glass fiber membrane 30 in the shape of a donut. The cell assembly was performed in a dry-room and then placed in an environmental test chamber (Tenney, USA) with a temperature controller (±1° C.).

Ionic conductivity measurements were performed using impedance spectroscopy. The ac impedance measurements were carried out in the frequency range from 1 MHz to 1 Hz using a VersaStat 4 (Ametek, USA) Frequency Response Analyzer (FRA) in a potentiostatic mode, with RMS ac voltage of 10 mV at temperatures between −60° C. to 75° C. All measurements were carried out at atmospheric pressure. The cell assembly was thermally equilibrated for at least 30 minutes for each temperature measurement. The bulk dc resistance (R) is extracted from the Nyquist representation using an equivalent circuit, where the high frequency segment of the plot intercepts the real axis. The bulk ionic dc conductivity of the electrolytes is calculated using the equation:

$$\sigma = I/(RA) \quad (1)$$

where, σ, I, R, and A denote the ionic conductivity, distance between electrodes, resistance of the electrolyte, and the cross-sectional area of the electrode, respectively.

Results and Discussion

Figure 2:
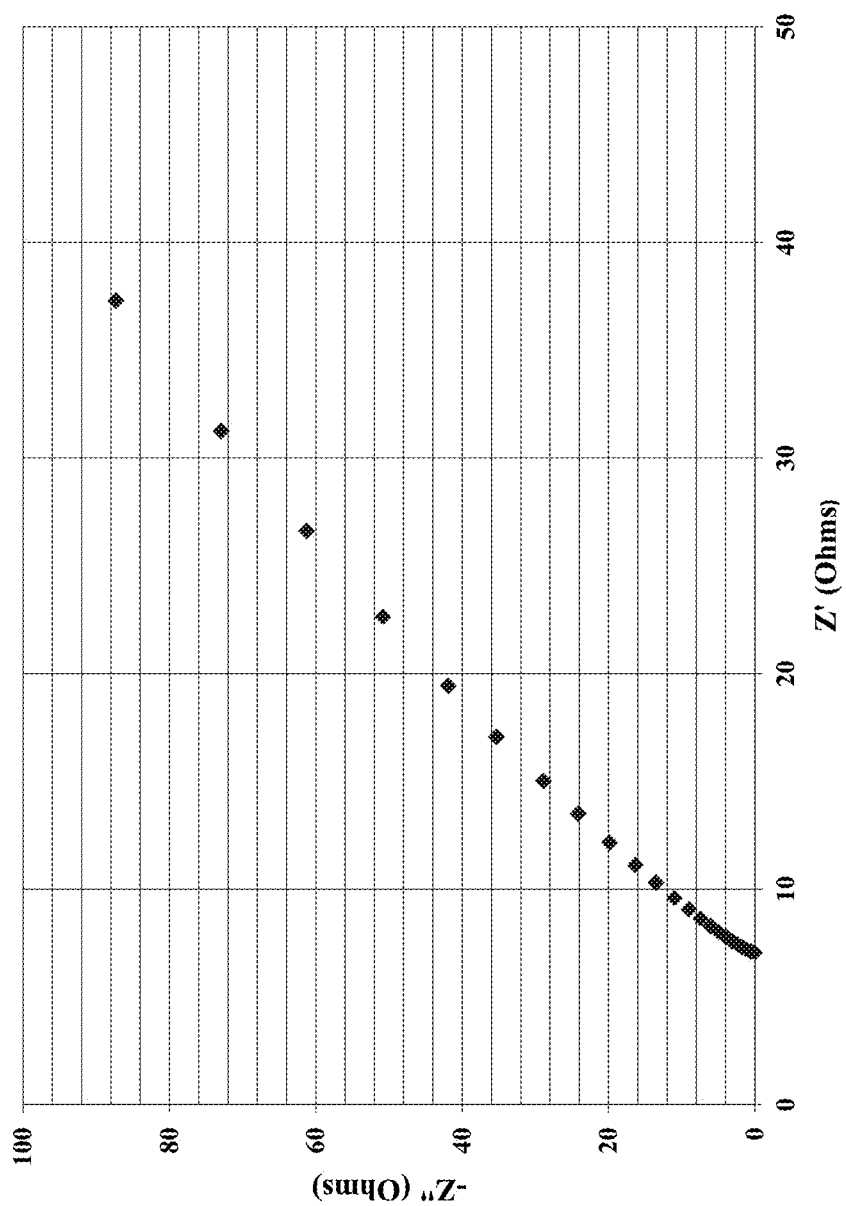
FIG. 2 shows a typical Nyquist plot for EMImTFSI+LiTFSI+100 nm BT+20 nm BN electrolyte at 75° C., according to an embodiment of the invention.

Typical Nyquist plots for EMImTFSI+LiTFSI+100 nm BT+20 nm BN at −25° C. and 75° C. are shown in FIGS. 1 and 2, respectively. Similar plots were obtained for PYR14TFSI+LiTFSI+10 nm BT, PYR14TFSI+LiTFSI+100 nm BT, PYR14TFSI+LiTFSI+400 nm BT, PYR14TFSI+LiTFSI+2 μm BT, PYR14TFSI+LiTFSI+20 nm BN, PYR14TFSI+LiTFSI+100 nm BT+20 nm BN as well as EMImTFSI+LiTFSI+100 nm BT, EMImTFSI+LiTFSI+20 nm BN, and EMImTFSI+LiTFSI+100 nm BT+20 nm BN electrolytes. These plots are analyzed using a simple Randall equivalent circuit. Bulk ionic conductivity of these colloidal ionic-liquids was evaluated using equation 1 wherein, the high frequency intercept on the real axis of the Nyquist plot was used for the bulk resistance, R. High ionic conductivity of electrolytes over a wide temperature range is desirable for electrochemical applications. The ionic conductivities of PYR14TFSI+LiTFSI+10 nm BT, PYR14TFSI+LiTFSI+100 nm BT, PYR14TFSI+LiTFSI+400 nm BT, PYR14TFSI+LiTFSI+2 μm BT, PYR14TFSI+LiTFSI+20 nm BN, PYR14TFSI+LiTFSI+100 nm BT+20 nm BN as well as EMImTFSI+LiTFSI+100 nm BT, EMImTFSI+LiTFSI+20 nm BN, EMImTFSI+LiTFSI+100 nm BT+20 nm BN were examined and compared to pure PYR14TFSI+LiTFSI and EMImTFSI+LiTFSI electrolytes, respectively.

Figure 3:
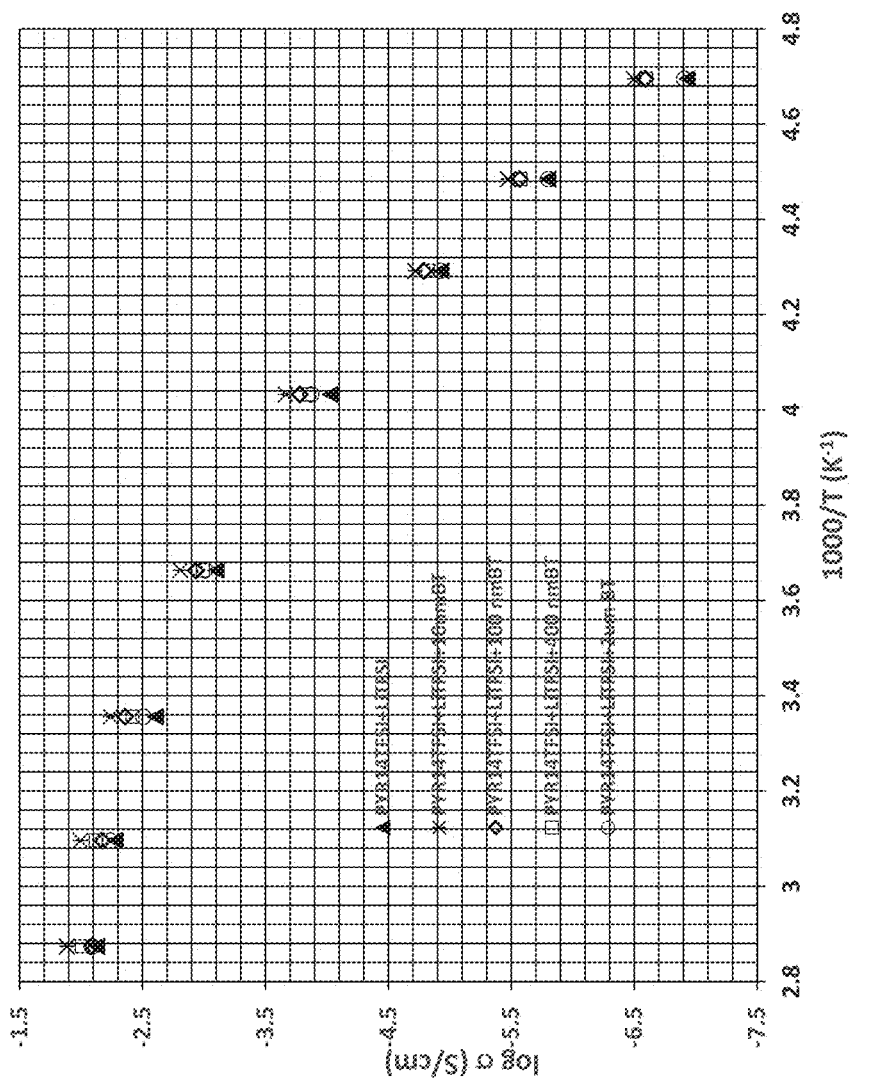
FIG. 3 shows a plot of ionic conductivity as a function of inverse temperature for PYR14TFSI+LiTFSI; PYR14TFSI+10 nm BT; PYR14TFSI+100 nm BT; PYR14TFSI+400 nm BT; and PYR14TFSI+2 μm BT electrolytes using a donut shape glass fiber membrane as separator, according to an embodiment of the invention.

FIG. 3 shows a representative plot of ionic conductivity as a function of inverse temperature for PYR14TFSI+LiTFSI+BT with various particle sizes of BT using a donut shape glass fiber membrane as separator. A particle size effect on the ionic conductivity is clearly observed. As the particle size of BT was reduced from 2 μm to 10 nm, a significant enhancement in the ionic conductivity is observed, especially at lower temperatures. The ionic conductivity of the colloidal electrolyte containing 10 nm BT (PYR14TFSI+LiTFSI+10 nm BT) exhibits the highest conductivity over the temperature range from −60° C. to 75° C.

Figure 4:
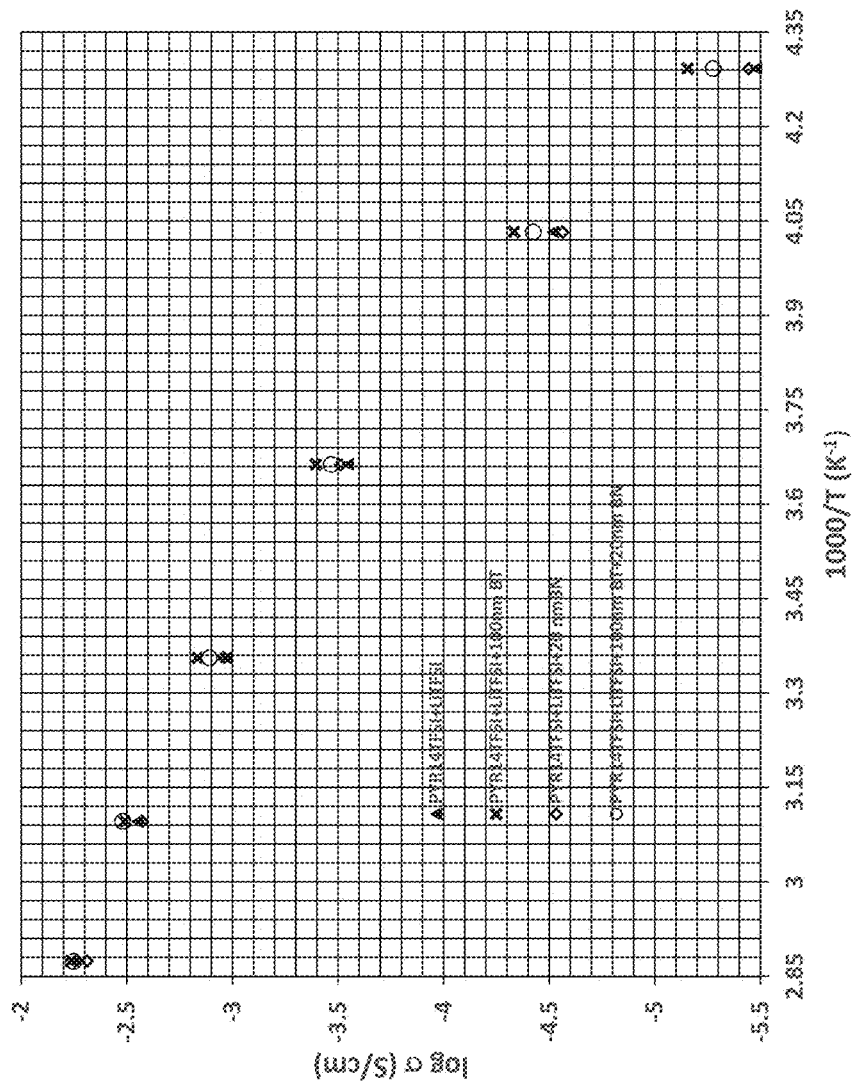
FIG. 4 shows a plot of ionic conductivity as a function of inverse temperature for PYR14TFSI+LiTFSI; PYR14TFSI+LiTFSI+100 nm BT; PYR14TFSI+LiTFSI+20 nm BN; and PYR14TFSI+LiTFSI+100 nm BT+20 nm BN electrolytes using a polypropylene mesh as separator, according to an embodiment of the invention.

FIG. 4 shows a representative plot of ionic conductivity as a function of inverse temperature for PYR14TFSI+LiTFSI+100 nm BT, PYR14TFSI+LiTFSI+20 nm BN, PYR14TFSI+LiTFSI+100 nm BT+20 nm BN and PYR14TFSI+LiTFSI electrolytes using polypropylene mesh as separator.

Figure 5:
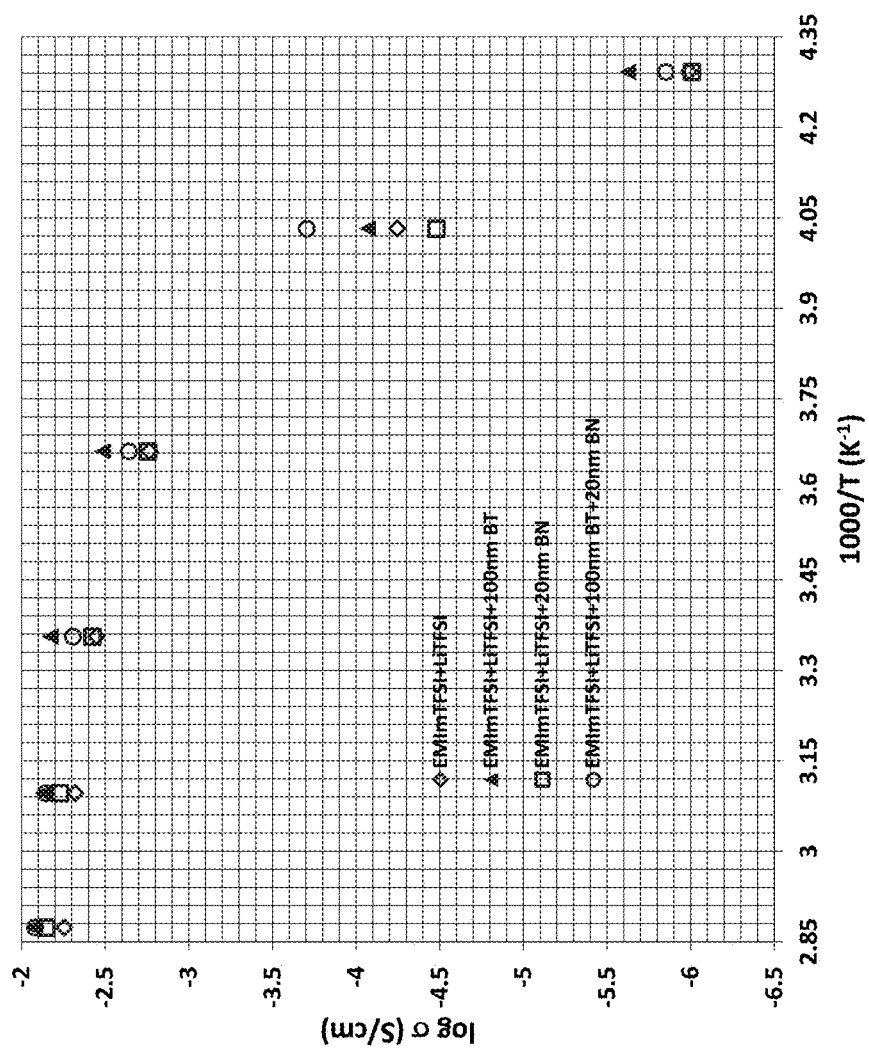
FIG. 5 shows a plot of Ionic conductivity as a function of inverse temperature for EMImTFSI+LiTFSI; EMImTFSI+LiTFSI+100 nm BT; EMImTFSI+LiTFSI+20 nm BN; and EMImTFSI+LiTFSI+100 nm BT+20 nm BN electrolytes using a donut shape glass fiber membrane as separator, according to an embodiment of the invention.
Figure 6A:
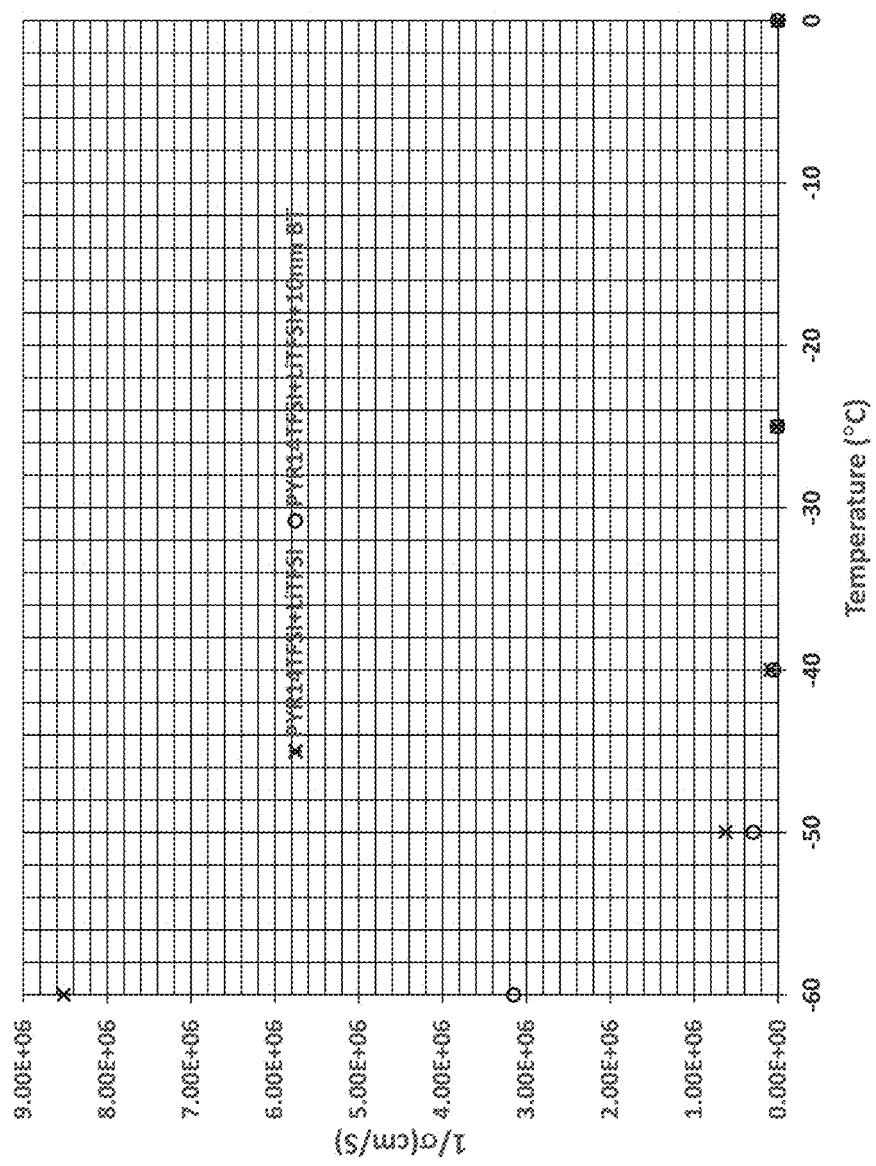
FIGS. 6a-6b are plots of resistivity as a function of temperature for PYR14TFSI+LiTFSI and PYR14TFSI+LiTFSI+10 nm BT electrolytes using a donut shape glass fiber membrane as separator (a) −60° C. to 0° C. and (b) 0° C. to 75° C., according to an embodiment of the invention.
Figure 6B:
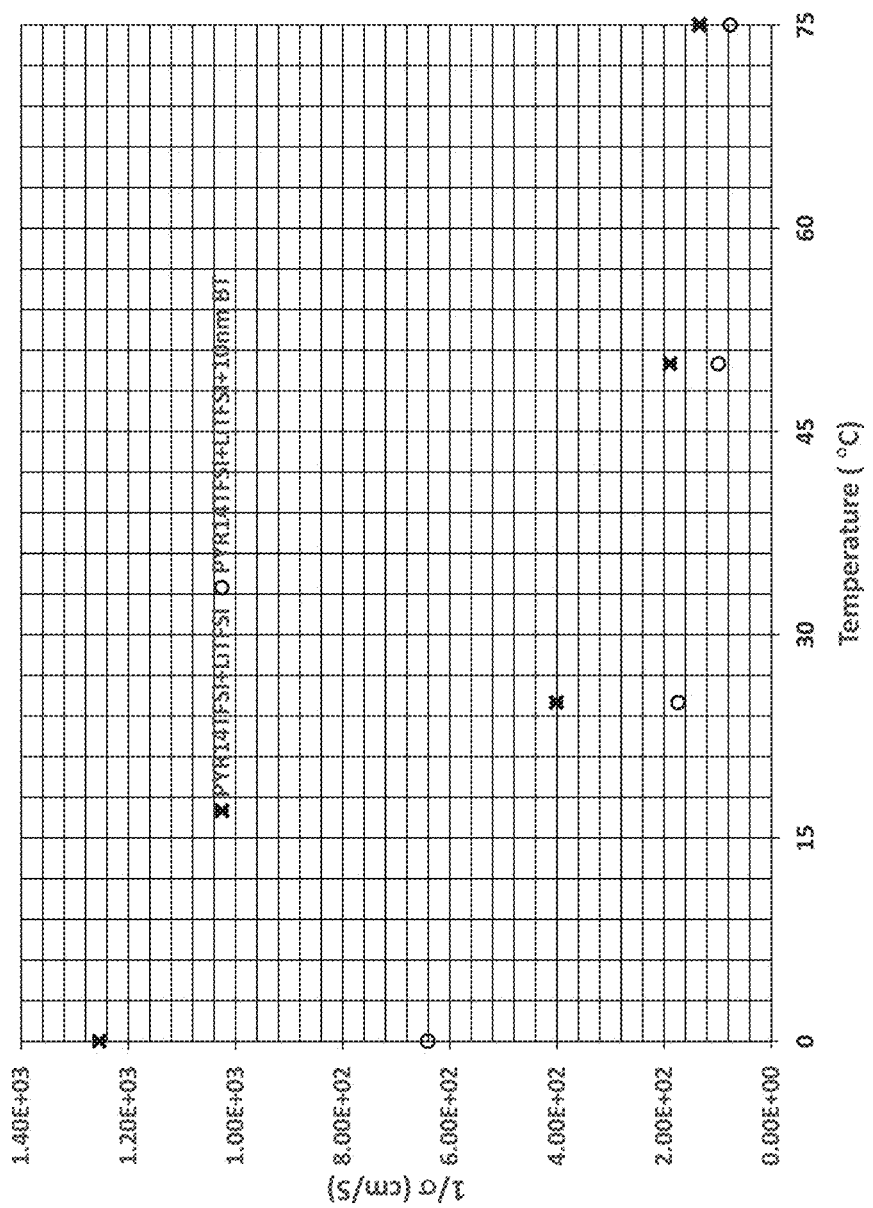
Figure 7:
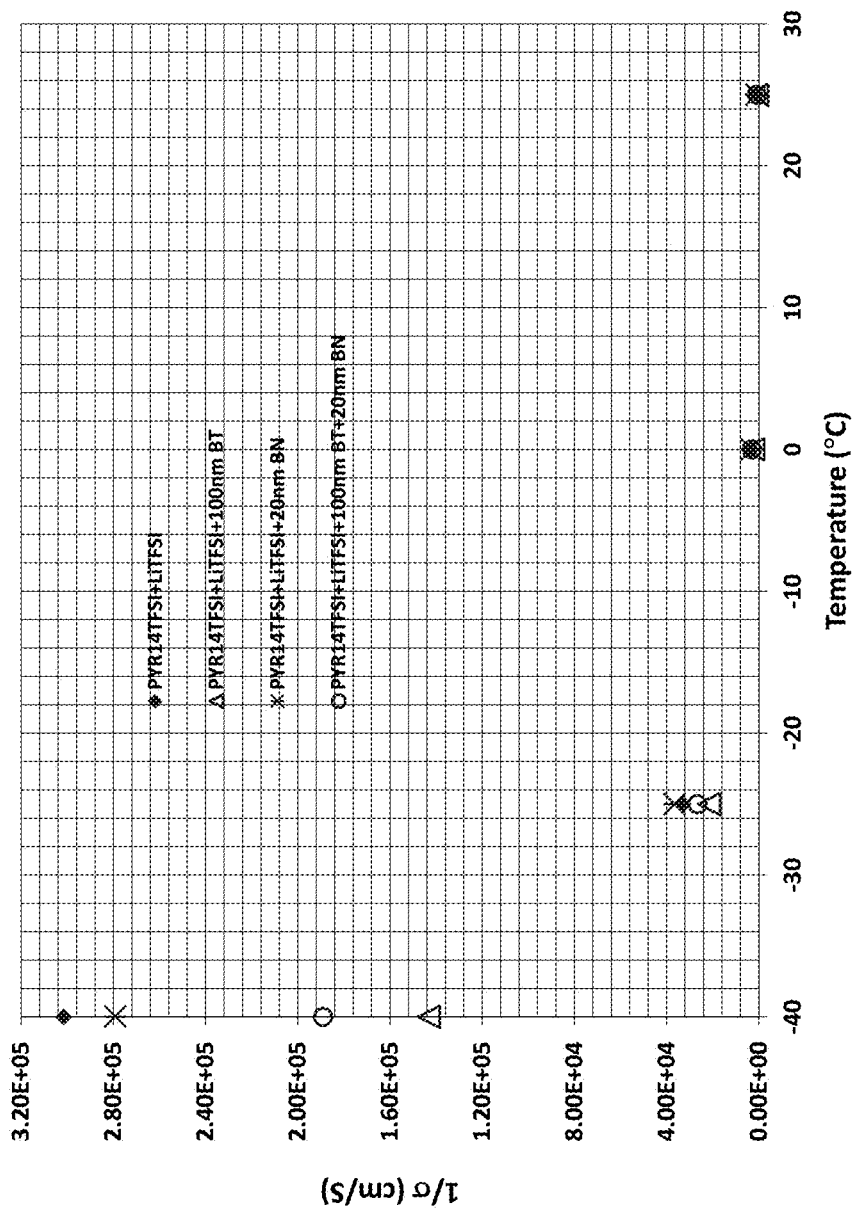
FIG. 7 is a plot of resistivity as a function of temperature for PYR14TFSI+LiTFSI; PYR14TFSI+LiTFSI+100 nm BT; PYR14TFSI+LiTFSI+20 nm BN; and PYR14TFSI+LiTFSI+100 nm BT+20 nm BN electrolytes using a polypropylene mesh as separator, according to an embodiment of the invention.
Figure 8:
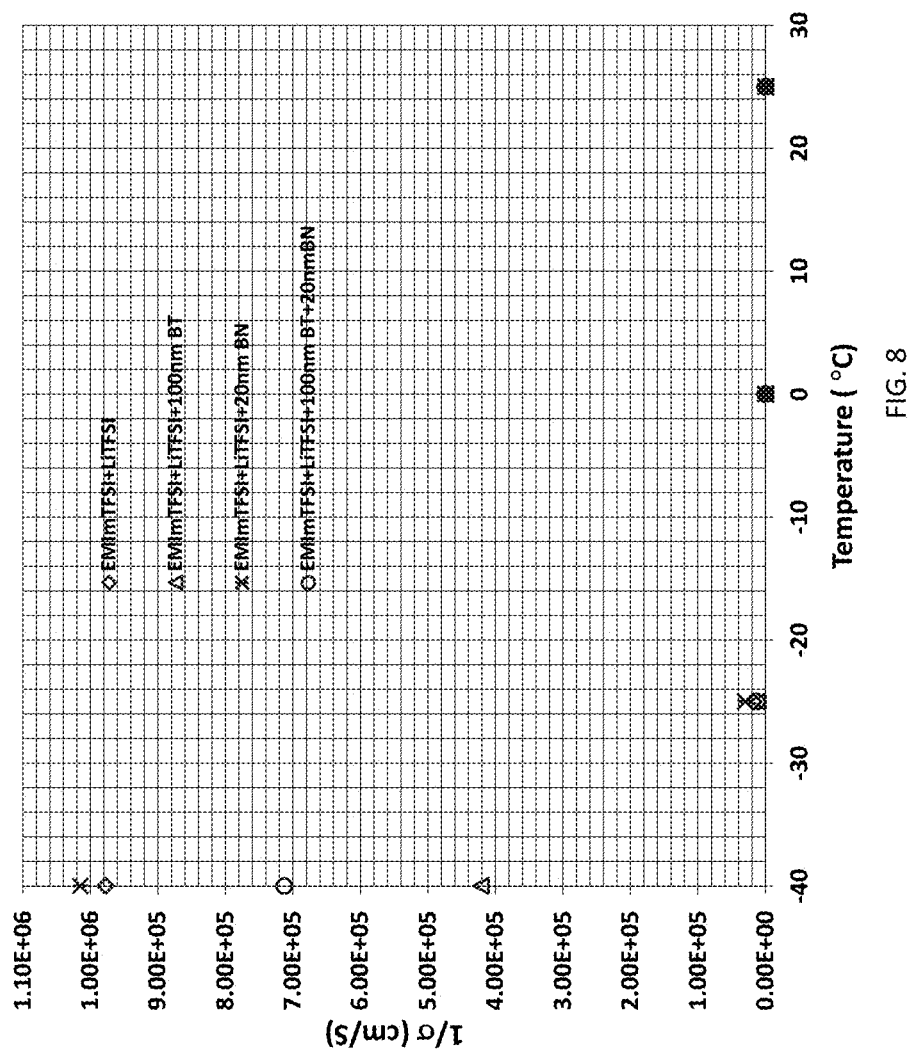
FIG. 8 is a plot of resistivity as a function of temperature for EMImTFSI+LiTFSI; EMImTFSI+LiTFSI+100 nm BT; EMImTFSI+LiTFSI+20 nm BN; and EMImTFSI+LiTFSI+100nmBT+20 nm BN electrolyte using a donut shape glass fiber membrane as separator, according to an embodiment of the invention.

FIG. 5 shows a representative plot of ionic conductivity as a function of inverse temperature for EMImTFSI+LiTFSI+100 nm BT, EMImTFSI+LiTFSI+20 nm BN, EMImTFSI+LiTFSI+100 nm BT+20 nm BN, and EMImTFSI+LiTFSI electrolytes using a donut shape glass fiber membrane as separator. It is observed from FIGS. 3, 4 and 5 that the ionic conductivity increases with temperature, and the ionic conductivity does not follow the typical Arrhenius behavior. There is an abrupt change in the conductivity for all electrolytes in the temperature range from 0° C. to −25° C. The temperature range at which the conductivity of the colloidal ionic-liquids significantly changes is due to the melting temperatures of the ionic liquids where the ionic-liquids also undergo phase transition. The ionic conductivity of PYR14TFSI+LiTFSI and EMImTFSI+LiTFSI electrolytes increases with addition of 10 wt % of 10 nm, 100 nm, 400 nm, and 2 μm BT, 20 nm BN and a blend of 100 nm BT and 20 nm BN.

The conductivity of ionic-liquids is inversely proportional to their viscosity. An increase in viscosity is known to cause a decrease in the free volume in the electrolyte and diminishes available pathways for ion mobility in the electrolyte. As temperature increases viscosity decreases and ionic conductivity increases. The data set at higher temperatures is more compact, because at higher temperatures, ionic motion is dominated more by the solvation sphere and the transition state for ionic motion.

Two regimes are exhibited in FIGS. 3, 4, and 5. In first region from 25° C. to 75° C., colloidal electrolytes with conductivities values of $10^{-3}$ S cm$^{-1}$ are observed. These conductivities for colloidal electrolytes are higher than for pure ionic-liquids. This enhancement in conductivity is due to faster mobility of the ions in the liquid phase of the PYR14TFSI+LiTFSI and EMImTFSI+LiTFSI. This increased conductivity is caused by an increase in the ion mobility at higher temperatures. A high lithium ion mobility is important for electrochemical device performance. Arrhenius law is the most commonly used (equation 2) to correlate the conductivity ($\sigma$) with temperature.

$$\sigma = \sigma_\infty \exp[E_a/K_B \cdot T] \quad (2)$$

where, $E_a$ is activation energy, $K_B$ is Boltzman constant, and $\sigma\infty$ is maximum conductivity at infinite temperature. However, for many glass-forming materials, the Vogel-Tammann-Fulcher (VTF) equation (see equation (3) below) is more appropriate.

$$\sigma = A\exp[-B/T-T_o] \quad (3)$$

where, A is the pre-exponential factor, B represents effective or pseudo activation energy for coupled ions and local segmental motion and $T_o$ is related to the ideal glass transition temperature ($T_g$). The pseudo activation energy (parameter B) is related to the energy needed for ion motion in the ionic-liquid.

In second region, between 0° C. to –40° C. or –60° C., colloidal electrolytes with conductivities values ranging from $10^{-4}$ to $10^{-6}$ S cm$^{-1}$ are observed. It should be noted that the polypropylene mesh and glass fiber membrane are thermally stable up to –40° C. and –60° C., respectively. Hence the maximum cold temperature used for ionic conductivity measurements were –40° C. for a polypropylene mesh disc and –60° C. for a glass fiber membrane.

To contrast the observed enhancement in conductivity in the cold temperature range, FIGS. 6a, 6b, 7, and 8 are plotted as resistivity vs temperature. It is noteworthy to see the significant difference in the resistivity for these colloidal electrolytes compared to the baseline ionic-liquids. The ionic conductivities of PYR14TFSI+LiTFSI electrolyte at the temperature 0° C., –25° C. and –60° C. were found to be 0.79, 0.094, and 0.00012 mS·cm$^{-1}$ respectively. The addition of 10 wt % 10 nm BT in PYR14TFSI+LiTFSI electrolyte significantly increases the ionic conductivity to 1.56, 0.218, and 0.000317 mS·cm$^{-1}$ at 0° C., –25° C. and –60° C. temperature, respectively. Similar enhancement in the ionic conductivity is observed for the other colloidal systems.

Ionic-liquids are characterized by weak ionic interactions, owing to the combination of a large cation and a charge-delocalized anion, resulting in a low tendency to crystallize due to flexibility of the anion and dissymmetry of the cation. The addition of nanoparticles further weakens this interaction between the cation and anion due to the increasing entropy in the system. Co-existence of nanoparticle and large cations possessing a low degree of symmetry also reduces the packing efficiency of the cation with small charge-delocalized anions. The reduction in the ionic pairing between lithium ion and the ionic-liquid anion increases the ionic conductivity and lithium diffusivity, especially in the cold temperature region.

To quantify the enhancement in the ionic conductivity, the ratio of ionic conductivity of colloidal ionic-liquids and pure ionic-liquid is determined. Tables 1a-1d lists the ionic conductivity of PYR14TFSI+LiTFSI, PYR14TFSI+LiTFSI+10 nm BT, PYR14TFSI+LiTFSI+100 nm BT, PYR14TFSI+LiTFSI+400 nm BT, and PYR14TFSI+LiTFSI+2 μm BT electrolytes using a donut shape glass fiber as separator at various temperatures. It is observed from Tables 1a-1d that the ionic conductivity of PYR14TFSI+LiTFSI+10 nm BT electrolyte is enhanced (5.75 mS·cm$^{-1}$) at 25° C. The ratio of the ionic conductivity ($\sigma 2/\sigma 1$) of these electrolytes is highest (2.64) at –60° C. Table 2 lists the ionic conductivity of PYR14TFSI+LiTFSI and PYR14TFSI+LiTFSI+100 nm BT+20 nm BN electrolyte using a polypropylene mesh as separator at various selected temperatures, while Table 3 compares the ionic conductivity of EMImTFSI+LiTFSI and EMImTFSI+LiTFSI+100 nm BT+20 nm BN using a donut shape glass fiber membrane as separator. It should be noted from Tables 2 that the ionic conductivity of PYR14TFSI+LiTFSI+100 nm BT+20 nm BN electrolyte (1.29 mS·cm$^{-1}$) is higher than that of PYR14TFSI+LiTFSI electrolyte (1.07 mS·cm$^{-1}$) at 25° C. The ratio of ionic conductivity ($\sigma 2/\sigma 1$) of these electrolytes is highest (1.60) at –40° C. Similar observation of higher ionic conductivity for EMImTFSI+LiTFSI+100 nm BT+20 nm BN (4.93 mS·cm$^{-1}$) than EMImTFSI+LiTFSI (3.16 mS·cm$^{-1}$) electrolyte is also observed at 25° C. The ratio of the ionic conductivity ($\sigma 2/\sigma 1$) of these electrolytes is maximum (1.37) at –40° C.

TABLE 1a

Ionic conductivity of PYR14TFSI + LiTFSI and PYR14TFSI + LiTFSI + 10 nm BT electrolytes using a donut shape glass fiber membrane as separator at different temperatures.

| Temperature (° C.) | PYR14TFSI + LiTFSI ($\sigma 1$) mS · cm$^{-1}$ | PYR14TFSI + LiTFSI + 10 nm BT ($\sigma 2$) mS · cm$^{-1}$ | $\sigma 2/\sigma 1$ |
|---|---|---|---|
| –60 | 0.00012 | 0.000317 | 2.64 |
| –50 | 0.0016 | 0.00337 | 2.11 |
| –40 | 0.012 | 0.019 | 1.58 |
| –25 | 0.094 | 0.218 | 2.32 |
| 0 | 0.79 | 1.56 | 1.97 |
| 25 | 2.5 | 5.75 | 2.30 |
| 50 | 5.3 | 10.1 | 1.91 |
| 75 | 7.5 | 13.1 | 1.75 |

TABLE 1b

Ionic conductivity of PYR14TFSI + LiTFSI and PYR14TFSI + LiTFSI + 100 nm BT electrolytes using a donut shape glass fiber membrane as separator at different temperatures.

| Temperature (° C.) | PYR14TFSI + LiTFSI ($\sigma 1$) mS · cm$^{-1}$ | PYR14TFSI + LiTFSI + 100 nm BT ($\sigma 2$) mS · cm$^{-1}$ | $\sigma 2/\sigma 1$ |
|---|---|---|---|
| –60 | 0.00012 | 0.000259 | 2.16 |
| –50 | 0.0016 | 0.00273 | 1.71 |
| –40 | 0.012 | 0.0162 | 1.35 |
| –25 | 0.094 | 0.167 | 1.78 |
| 0 | 0.79 | 1.16 | 1.45 |
| 25 | 2.5 | 4.42 | 1.78 |
| 50 | 5.3 | 6.69 | 1.26 |
| 75 | 7.5 | 8.17 | 1.09 |

TABLE 1c

Ionic conductivity of PYR14TFSI + LiTFSI and
PYR14TFSI + LiTFSI + 400 nm
BT electrolytes using a donut shape glass fiber membrane
as separator at different temperatures.

| Temperature (° C.) | PYR14TFSI + LiTFSI ($\sigma1$) mS·cm$^{-1}$ | PYR14TFSI + LiTFSI + 400 nm BT ($\sigma2$) mS·cm$^{-1}$ | $\sigma2/\sigma1$ |
|---|---|---|---|
| −60 | 0.00012 | 0.000254 | 2.12 |
| −50 | 0.0016 | 0.00267 | 1.67 |
| −40 | 0.012 | 0.0151 | 1.26 |
| −25 | 0.094 | 0.139 | 1.48 |
| 0 | 0.79 | 1.02 | 1.29 |
| 25 | 2.5 | 3.82 | 1.53 |
| 50 | 5.3 | 7.61 | 1.44 |
| 75 | 7.5 | 9.81 | 1.31 |

TABLE 1d

Ionic conductivity of PYR14TFSI + LiTFSI and
PYR14TFSI + LiTFSI + 2 μm BT
electrolytes using a donut shape glass fiber membrane as
separator at different temperatures.

| Temperature (° C.) | PYR14TFSI + LiTFSI ($\sigma1$) mS·cm$^{-1}$ | PYR14TFSI + LiTFSI + 2 μm BT ($\sigma2$) mS·cm$^{-1}$ | $\sigma2/\sigma1$ |
|---|---|---|---|
| −60 | 0.00012 | 0.000124 | 1.03 |
| −50 | 0.0016 | 0.0016 | 1.00 |
| −40 | 0.012 | 0.0122 | 1.02 |
| −25 | 0.094 | 0.134 | 1.43 |
| 0 | 0.79 | 0.981 | 1.24 |
| 25 | 2.5 | 3.13 | 1.25 |
| 50 | 5.3 | 5.78 | 1.09 |
| 75 | 7.5 | 8.16 | 1.09 |

TABLE 2

Ionic conductivity of PYR14TFSI + LiTFSI and
PYR14TFSI + LiTFSI + 100 nm BT + 20 nm BN electrolytes
using a polypropylene mesh as separator at different temperatures.

| Temperature (° C.) | PYR14TFSI + LiTFSI ($\sigma1$) mS·cm$^{-1}$ | PYR14TFSI + LiTFSI + 100 nm BT + 20 nm BN ($\sigma2$) mS·cm$^{-1}$ | $\sigma2/\sigma1$ |
|---|---|---|---|
| −40 | 0.00332 | 0.00529 | 1.60 |
| −25 | 0.0304 | 0.0376 | 1.24 |
| 0 | 0.285 | 0.347 | 1.22 |
| 25 | 1.071 | 1.286 | 1.20 |
| 50 | 2.812 | 3.318 | 1.18 |
| 75 | 5.625 | 5.66 | 1.01 |

TABLE 3

Ionic conductivity of EMImTFSI + LiTFSI and EMImTFSI + LiTFSI +
100 nm BT + 20 nm BN electrolytes using a donut shape glass fiber
membrane as separator at different temperatures.

| Temperature (° C.) | EMImTFSI + LiTFSI ($\sigma1$) mS·cm$^{-1}$ | EMImTFSI + LiTFSI + 100 nm BT + 20 nm BN ($\sigma2$) mS·cm$^{-1}$ | $\sigma2/\sigma1$ |
|---|---|---|---|
| −40 | 0.0102 | 0.00140 | 1.37 |
| −25 | 0.0568 | 0.0786 | 1.38 |
| 0 | 1.72 | 2.29 | 1.33 |
| 25 | 3.16 | 4.93 | 1.56 |
| 50 | 4.80 | 7.18 | 1.50 |
| 75 | 5.57 | 8.29 | 1.49 |

This marked enhancement in conductivity is due to the interaction of ionic-liquids with nanosize particles of BaTiO$_3$, BN and blend of BaTiO$_3$ and BN. This suggests that addition of nanoparticles helps improve pathways for ions to move through the electrolyte, resulting in a significant increase in conductivity. The dielectric constant is another factor that plays an important role in improving the conductivity. The dielectric constant is the ratio of the permittivity of a substance to the permittivity of free space. It is an expression of the extent to which a material concentrates electric flux. As the dielectric constant increases, the electric flux density increases enabling objects to hold their electric charge for long periods of time and/or to hold large quantities of charge. The insertion of a dielectric between the plates of a parallel plate capacitor always increases its capacitance or ability to store opposite charges in each plate. The dielectric constant for BaTiO$_3$ is 2000 when the electric field is applied perpendicularly to principal axis of the crystal. This high dielectric constant is also an important factor where ionic-clusters or ion-aggregates are significantly reduced, thereby enhancing lithium diffusivity and increasing ionic conductivity.

Colloidal ionic-liquid electrolytes based on PYR14TFSI, and EMImTFSI ionic-liquids were prepared by incorporation of barium titanate with an average particle size of 10 nm, 100 nm, 400 nm, and 2 μm and boron nitride with average particle size of 20 nm in the LiTFSI salt-containing ionic-liquids. The analysis of complex impedance spectroscopy over a wide temperature range was employed to determine the ionic conductivity of these various colloidal ionic-liquids. It is found that the ionic conductivity of colloidal electrolytes is significantly higher than that of PYR14TFSI+LiTFSI and EMImTFSI+LiTFSI electrolytes in the temperature region between 25° C. to −40° C./−60° C. This enhancement in ionic conductivity of colloidal ionic-liquid is due to improved pathways for ion mobility in the electrolyte, reduced ionic pairing between lithium ion and the ionic-liquid anion and a higher dielectric constant of barium titanate nanoparticles.

Figure 9:
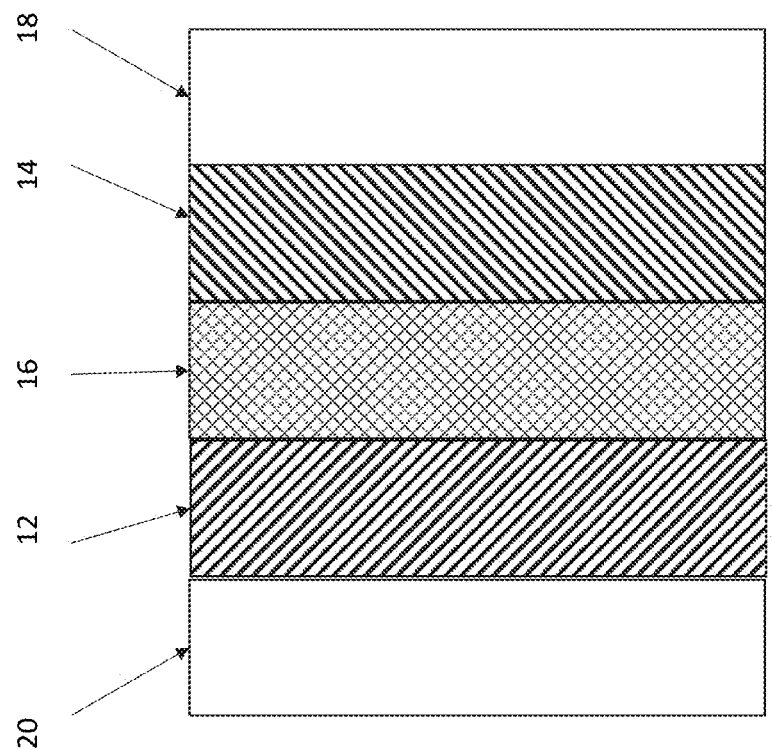
FIG. 9 is a simplified schematic of an exemplary electrochemical device comprising the colloidal electrolyte composition in accordance with an embodiment of the invention.

Accordingly, the addition of high dielectric nanoparticles, alone or in combination with low dielectric nanoparticles, in the room temperature ionic-liquid to form a colloidal ionic-liquid electrolyte represents an important approach for enhancing the ionic conductivity of electrolytes for energy conversion and storage devices. A simplified schematic of an exemplary electrochemical device is shown in FIG. 9 that may incorporate the colloidal electrolyte composition in accordance with an embodiment of the invention. For example, an exemplary electrochemical device 10 is provided that comprises at least one anode 12, at least one cathode 14, and at least one layer of the colloidal electrolyte 16 providing electrolytic communication there between. Current collectors 18, 20 are in electrolytic communication with its respective electrode.

As used herein and in the appended claims, the singular forms "a", "an" and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A colloidal electrolyte composition for an electrochemical device comprising:
   a room temperature ionic-liquid,
   a lithium salt consisting of one or more of lithium halides, lithium tetrafluoroborate, and lithium bis(trifluoromethylsulfonyl)imide, and
   a ceramic powder comprising a high dielectric material and a low dielectric material, the high dielectric material having a first dielectric constant of about 200 or more, and a first mean particle size ($D^1v50$) of about 2000 nm or less,
   wherein the colloidal electrolyte composition is a liquid at 25° C., wherein the high dielectric material is selected from the group consisting of $KSrTiO_3$, $KTaNbO_3$, $Pb_3MgNb_2O_9$, and mixtures thereof, wherein the low dielectric material is selected from the group consisting of $HfO_2$, $MgO$, $ZnO$, $SrO$, $BaO$, $CaO$, $ZrO_2$, $Al_2O_3$, $SiO_2$, BN, SiC, $Si_3N_4$, and mixtures thereof, and wherein the room temperature ionic-liquid comprises an organic cation selected from a pyrazolium moiety, a guanidinium moiety, or combinations thereof.

2. The colloidal electrolyte composition of claim 1, wherein the low dielectric material has a second dielectric constant of about 50 or less, and a second mean particle size ($D^2v50$) of about 100 nm or less.

3. The colloidal electrolyte composition of claim 2, wherein the first mean particle size ($D^1v50$) of the high dielectric material is in a range from about 5 nm to about 2000 nm, and wherein the second mean particle size ($D^2v50$) of the low dielectric material is in a range from about 5 nm to about 100 nm.

4. The colloidal electrolyte composition of claim 2, wherein the first mean particle size ($D^1v50$) of the high dielectric material is in a range from about 5 nm to about 500 nm, and wherein the second mean particle size ($D^2v50$) of the low dielectric material is in a range from about 5 nm to about 75 nm.

5. The colloidal electrolyte composition of claim 2, wherein a difference between the first dielectric constant and the second dielectric constant is about 175 or more.

6. The colloidal electrolyte composition of claim 2, wherein a ratio between the first dielectric constant and the second dielectric constant is in a range from about 4 to about 2,500.

7. The colloidal electrolyte composition of claim 2, wherein a ratio between the first dielectric constant and the second dielectric constant is in a range from about 10 to about 800.

8. The colloidal electrolyte composition of claim 2, wherein a ratio between the first dielectric constant and the second dielectric constant is in a range from about 50 to about 600.

9. The colloidal electrolyte composition of claim 1, wherein the room temperature ionic-liquid comprises an anion selected from halides, tetrafluoroborate, hexafluorophosphate, bis(trifluoromethanesulphonyl)imide, bis(perfluoro-ethanesulfonyl)imide, trifluoromethylsulphonate, methylsulfonate, ethylsulfonate, phenylsulfonate, p-toluenesulfonate, dicyanimide, or combinations thereof.

10. A colloidal electrolyte composition for an electrochemical device comprising:
    a room temperature ionic-liquid,
    a lithium salt, and
    a ceramic powder comprising a high dielectric material having a first dielectric constant of about 200 or more, and a first mean particle size ($D^1v50$) of about 2000 nm or less,
    wherein the colloidal electrolyte composition is a liquid at 25° C., wherein the high dielectric material is selected from the group consisting of $KSrTiO_3$, $KTaNbO_3$, $Pb_3MgNb_2O_9$, and mixtures thereof, wherein a low dielectric material is selected from the group consisting of SiC, $Si_3N_4$, and mixtures thereof, and wherein the room temperature ionic-liquid comprises an anion selected from bis(perfluoro-ethanesulfonyl)imide, trifluoromethylsulphonate, methylsulfonate, ethylsulfonate, phenylsulfonate, p-toluenesulfonate, dicyanimide, or combinations thereof.

11. A colloidal electrolyte composition for an electrochemical device comprising:
    a room temperature ionic-liquid,
    a lithium salt, and
    a ceramic powder comprising a high dielectric material having a first dielectric constant of about 200 or more, and a first mean particle size ($D^1v50$) of about 2000 nm or less,
    wherein the colloidal electrolyte composition is a liquid at 25° C., wherein the high dielectric material is selected from the group consisting of $KSrTiO_3$, $KTaNbO_3$, $Pb_3MgNb_2O_9$, and mixtures thereof, wherein a low dielectric material is selected from the group consisting of SiC, $Si_3N_4$, and mixtures thereof, and wherein the ionic-liquid comprises an organic cation selected from a pyrazolium moiety, a guanidinium moiety, or combinations thereof.

* * * * *